(12) United States Patent
Marugame

(10) Patent No.: US 8,374,434 B2
(45) Date of Patent: Feb. 12, 2013

(54) FEATURE QUANTITY CALCULATION USING SUB-INFORMATION AS A FEATURE EXTRACTION FILTER

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 1133 days.

(21) Appl. No.: 12/086,778

(22) PCT Filed: Nov. 28, 2006

(86) PCT No.: PCT/JP2006/323695
§ 371 (c)(1),
(2), (4) Date: Jun. 19, 2008

(87) PCT Pub. No.: WO2007/074600
PCT Pub. Date: Jul. 5, 2007

(65) Prior Publication Data
US 2009/0003710 A1    Jan. 1, 2009

(30) Foreign Application Priority Data

Dec. 26, 2005  (JP) ................................. 2005-373058

(51) Int. Cl.
*G06K 9/00* (2006.01)
(52) U.S. Cl. .......................... 382/181; 382/116; 382/224
(58) Field of Classification Search ........................ None
See application file for complete search history.

(56) References Cited

U.S. PATENT DOCUMENTS 3,571,796 A * 3/1971 Brugger ........................ 382/196
6,929,180 B2 * 8/2005 Tsukamoto et al. .......... 382/125

FOREIGN PATENT DOCUMENTS

| JP | 11-213152   | 8/1999 |
| JP | 2001-188906 | 7/2001 |
| JP | 2003-157439 A | 5/2003 |
| JP | 2004-021924 A | 1/2004 |

OTHER PUBLICATIONS

Walther et al. (Jun. 2005) "Selective visual attention enables learning and recognition of multiple objects in cluttered scenes." Computer Vision and Image Understanding, vol. 100 pp. 41-63.*
P. Belhumeur et al., "What is the set of images of an object under all possible illumination conditions?", International Journal of Computer Vision, vol. 28:3, 1998 pp. 245-260, Kluwer Acad. Pub, Boston.

* cited by examiner

*Primary Examiner* — Barry Drennan
(74) *Attorney, Agent, or Firm* — Foley & Lardner LLP

(57) ABSTRACT

To extract a feature advantageous for classification and correlation by using the information difficult to be acquired even when it is impossible to acquire the information difficult-to-be-acquired from all individuals. Sub-information input device inputs information difficult to be acquired and accumulates the inputted sub-information. Main information input device inputs information easy to be acquired as main information, and accumulates the inputted main information. Sub-information selection device evaluates a category attribution degree of each sub-information accumulated and selects the sub-information of a high category attribution degree. The correlation feature extraction device uses the sub-information selected by the sub-information selection device as the feature extraction filter, and extracts a feature corresponding to the main information from a correlation between the main information and the sub-information.

18 Claims, 11 Drawing Sheets

FEATURE QUANTITY CALCULATION USING SUB-INFORMATION AS A FEATURE EXTRACTION FILTER

TECHNICAL FIELD/BACKGROUND OF THE INVENTION

The present invention relates to a feature extraction apparatus, a feature extraction method, and a feature extraction program for extracting features for classification and correlation of data.

BACKGROUND ART

In a data group including plural individual pieces, two or more types of information such as image and three-dimensional information are sometimes used for performing classification and correlation with respect to each individual piece of data. The accuracy of classification and correlation can be enhanced generally by using plural types of information.

However, the difficulty level in acquiring information (easiness to acquire information) differs depending on the type of the information. For instance, in an example of image and three-dimensional information, the image can be easily acquired by a camera. However, a range finder or the like needs to be used to acquire the three-dimensional information. The three-dimensional information is more difficult to acquire than the image since the range finder is generally not widespread used as with cameras. Also, it is expensive and its use conditions are limited.

If the difficulty level in acquiring information differs as described above, the information amount of the type of information with high difficulty level in acquiring, that is, difficult to be acquired, becomes less than the information of the type of information with low difficulty level in acquiring, that is, easy to be acquired. In such case, the data lacking in information of the type of high acquiring difficulty is removed from the classification and classification target, or, correlation and classification are performed by using only the information of the type of low acquiring difficulty. With this, however, the accuracy of classification and correlation becomes difficult to be enhanced.

Patent document 1 discloses an image classification device (defect classification device) for automatically classifying a defected image. Patent document 2 discloses a correlation extraction device of an image feature quantity. Patent document 3 discloses a face feature extraction device.

Patent document 1: Japanese Laid-Open Patent Publication No. 2001-188906 (paragraph 0051)
Patent document 2: Japanese Laid-Open Patent Publication No. 2003-157439 (paragraph 0022)
Patent document 3: Japanese Laid-Open Patent Publication No. 2004-21924 (paragraphs 0028-0044)

DISCLOSURE OF THE INVENTION

"Information that is not necessarily acquirable from all individuals" is referred to as information difficult-to-be-acquired. It is preferable that a feature advantageous for classification and correlation can be extracted by using the information difficult to be acquired that has been able to be acquired, even when it is impossible to acquire the information difficult-to-be-acquired from all individuals. Here, feature refers to a feature which can be used in classification and correlation of data.

Further, feature extraction suited for classification and correlation is preferably performed.

Furthermore, feature extraction dependent on an internal structure of the data such as appearance is preferably performed.

It is an object of the present invention to provide a feature extraction apparatus, a feature extraction method, and a feature extraction program capable of extracting a feature advantageous for classification and correlation by using information difficult to be acquired even when it is impossible to acquire the information difficult-to-be-acquired from all individuals. Another object is to provide a feature extraction apparatus, a feature extraction method, and a feature extraction program capable of performing feature extraction suited for classification and correlation. Still another object is to provide a feature extraction apparatus, a feature extraction method, and a feature extraction program capable of performing feature extraction dependent on an internal structure of the data such as appearance.

A feature extraction apparatus according to the present invention relates to a feature extraction apparatus for extracting, from main information obtained from an individual piece of data, a feature of the individual piece; the feature extraction device including a correlation feature extraction device for calculating a feature quantity of an individual piece, based on a correlation between the main information and sub-information which is different from the main information, and using the main information and the sub-information.

The feature extraction device may include a sub-information storage device (e.g., sub-information input device 20) for storing the sub-information classified into categories in advance, and a sub-information selection device for calculating a category attribution degree of each sub-information and selecting sub-information whose attribution degree is larger than a predetermined reference, wherein the correlation feature extraction device calculates the feature quantity of the individual piece based on the correlation between the main information and the sub-information, by using the main information and the sub-information which is selected by the sub-information selection device.

The sub-information selection device may perform a main component analysis of the sub-information, and calculate the attribution degree using a reconfiguration error in a category to which the sub-information being a target for calculating the attribution degree belongs and an average of the reconfiguration error in categories other than the relevant category.

The correlation feature extraction device may calculate the feature quantity using a difference between the main information and the sub-information having the same dimension.

A feature extraction method according to the present invention relates to a feature extraction method for extracting, from main information obtained from an individual piece of data, a feature of the individual piece. In this method, a correlation feature extraction device calculates a feature quantity of an individual piece based on a correlation between the main information and sub-information which is different from the main information, by using the main information and the sub-information.

In this method, the sub-information storage device may store the sub-information classified into categories in advance, the sub-information selection device may calculate a category attribution degree of each sub-information and select sub-information whose attribution degree is larger than a predetermined reference; and the correlation feature extraction device may calculate the feature quantity of the individual piece based on the correlation between the main information and the sub-information, by using the main information and the sub-information which is selected by the sub-information selection device.

The sub-information selection device may perform a main component analysis of the sub-information, and calculate the attribution degree by using a reconfiguration error in a category to which the sub-information being a target for calculating the attribution degree belongs and an average of the reconfiguration error in categories other than the relevant category.

The correlation feature extraction device may calculate the feature quantity using a difference between the main information and the sub-information having the same dimension.

A feature extraction program according to the present invention relates to a feature extraction program loaded on a computer for extracting, from main information obtained from an individual piece of data, a feature of the individual piece, the computer including a sub-information storage device (e.g., storage apparatus 703) for storing sub-information which is different from the main information and being classified into categories in advance; the program causing the computer to execute a correlation feature extraction process of calculating a feature quantity of an individual based on a correlation between the main information and the sub-information, by using the main information and the sub-information.

The program may further cause the computer to execute a sub-information selection process of calculating a category attribution degree of each sub-information and selecting sub-information whose attribution degree is larger than a predetermined reference, wherein the feature quantity of the individual piece is calculated based on the correlation between the main information and the sub-information, by using the main information and the selected sub-information in the correlation feature extraction process.

The program may further cause the computer to perform a main component analysis of the sub-information, and calculate the attribution degree using a reconfiguration error in a category to which the sub-information being a target for calculating the attribution degree belongs and an average of the reconfiguration error in categories other than the relevant category in the sub-information feature selection process.

The program may further cause the computer to calculate the feature quantity using a difference between the main information and the sub-information having the same dimension in the correlation feature extraction.

In the present invention, the correlation feature extraction device calculates the feature quantity of the individual piece based on the correlation between the main information and the sub-information which is different from the main information, by using the main information and the sub-information. Therefore, a feature dependent on the internal structure of the data such as appearance can be extracted.

The sub-information selection device calculates the category attribution degree of each sub-information and selects the sub-information whose attribution degree is larger than a predetermined reference, and the correlation feature extraction device calculates the feature quantity of the individual piece using the main information and the selected sub-information. Therefore, the feature can be extracted using the sub-information even when the sub-information cannot be acquired from all the individuals.

Further, since the sub-information classified into categories in advance is used, the feature quantity having information which is unique with each category can be calculated. As a result, the feature quantity suited for classification of the data can be calculated.

Furthermore, with arranging the sub-information storage device for storing the sub-information classified into categories in advance, the feature quantity can be calculated when the main information is input. Therefore, the design of the system for performing data classification can be facilitated.

According to the present invention, a feature quantity advantageous for classification and correlation can be calculated by using information difficult to be acquired even when it is impossible to acquire the information difficult-to-be-acquired from all individuals. Also, a feature quantity dependent on the internal configuration of the data such as appearance can be calculated. Further, the feature quantity suited for classification of the data can be calculated. Furthermore, the design of the system for performing data classification can be facilitated.

BEST MODE FOR CARRYING OUT THE INVENTION

In the present invention, the information of a representative individual piece which is difficult to be acquired is selected as the information (difficult-to-be-acquired information) that is not necessarily acquirable from all individuals. Such difficult-to-be-acquired information is then used as a feature extraction filter for extracting a feature from the information easy to be acquired. The information which is easy to be acquired is information that can be acquired from each individual piece. Individual piece is one of the data in each category.

The representative individual piece of the information difficult-to-be-acquired is selected by using a category attribution degree of each of information difficult-to-be-acquired. "High category attribution degree" refers to a state in which an approximate expression by other members of the category to which the piece of data belongs is easy, and an approximate expression by the member of other categories is difficult.

The attribution degree is calculated in the following manner (more detailed description of the attribution degree calculation will be described later). With regards to the each individual piece of data, the approximate expression by a member other than itself in the category to which the relevant individual data belongs is calculated, and the expression error (error in self-category) in that case is recorded. The approximate expression by all the members of each category to which the individual piece being focused does not belong (approximate expression with a same method as the approximate expression by the members in the same category) is calculated, and the expression error (error in non-belonging category) in that case is calculated. Furthermore, an average of the errors in all the non-belonging categories is calculated. The attribution degree is represented as a difference between the average of the errors in all the non-belonging categories and the error in the self-category, or as a ratio between the average of the errors in all the non-belonging categories and the error in the self-category.

Information with high attribution degree, as defined above, is being the information in which the feature of the self-category with respect to other categories is emphasized. The performance of data classification can be enhanced by using information with high attribution degree.

In the case of correlation, the self-category is considered as one data, while the other categories are considered as one. The definition of attribution degree is expressed as the reconfiguration error in the categories which are configured other than the self-category.

The individual piece with high attribution degree out of the information difficult to be acquired (more specifically, difficult-to-be-acquired information acquired from the relevant individual piece) is selected and assumed as a feature extraction filter. The feature extraction is performed on the information easy-to-be-acquired by using a correlation between the information easy-to-be-acquired and the information difficult-to-be-acquired. As the simplest example, a difference between the information easy-to-be-acquired and the information difficult-to-be-acquired is used as the correlation between the information easy-to-be-acquired and the information difficult-to-be-acquired. If the relationship is clear such as with image and illumination space base, such relationship can be used for correlation. Thus, the correlation reflects the internal structure of the data, and the feature to be extracted is also influenced by the data.

The difficult-to-be-acquired information used as the feature extraction filter is selected based on the attribution degree rather than being arbitrarily selected. In other words, information (difficult-to-be-acquired information) advantageous for classification and correlation representing the property of the category is selected. Therefore, a feature advantageous for classification and correlation can be extracted.

The reconfiguration error and the error minimum estimate error will be described below. First, the reconfiguration error will be described. The true information (e.g., true image) is assumed as It. The information It is expressed as It=f(P1, P2, ..., Pn) by elements P1, ..., Pn and a function f(·). The information reconfigured by insufficient elements P1, ..., Pn and the function f(·) is assumed as Ia. The information Ia is expressed as Ia=f(P1, ..., Pn) by the insufficient elements P1, ..., Pn. In Ia, the true information It and the information Ia do not match since the elements are insufficient. The difference between them (It and Ia) is referred to as reconfiguration error.

When estimating the information It by f(P1, ..., Pn), estimation is made through an estimation method (e.g., least squares estimation) such that the reconfiguration error becomes a minimum. The error in this case becomes the error minimum estimate error.

The exemplary embodiments of the invention will now be described with reference to the drawings.

First Exemplary Embodiment

FIG. 1 is a block diagram showing a configuration example of a first exemplary embodiment of the present invention. A feature extraction apparatus according to the first exemplary embodiment includes a main information input device 10, a sub-information input device 20, a sub-information selection device 30, and a correlation feature extraction device 40.

The main information input device 10 inputs information easy to be acquired as main information, and accumulates the inputted main information. The sub-information input device 20 inputs information difficult to be acquired as sub-information, and accumulates the inputted sub-information.

The sub-information selection device 30 selects the information difficult-to-be-acquired that is effective in classification and correlation of data from the sub-information inputted and accumulated in the sub-information input device 20.

The correlation feature extraction device 40 extracts a feature related to the correlation between the main information and the sub-information from the sub-information which is selected by the sub-information selection device 30.

The extracted feature is referenced when carrying out classification and correlation of the data. The feature extraction apparatus may include a learning/identification device 50 for performing classification and correlation of the data. However, the learning/identification device 50 is not an essential component of the feature extraction apparatus. If the feature extraction apparatus includes the learning/identification device 50, the learning/identification device 50 becomes the output destination to which the correlation feature extraction device 40 outputs the feature.

The operation will now be described.

FIG. 2 is a flowchart showing an example of progress of the process by the feature extraction apparatus in the first exemplary embodiment. The sub-information input device 20 inputs information difficult to be acquired as sub-information, and accumulates (stores) the inputted sub-information (step S1). The accumulation of the sub-information in step S1 is performed prior to step S2. The sub-information input device 20 collectively inputs each sub-information, and accumulates the same. An example of information difficult to be acquired that becomes the sub-information includes information acquired by a special device such as a range finder and a thermo-camera. More specifically, the information includes three-dimensional information acquired by the range finder, the thermo image acquired by the thermo-camera, and the like. The sub-information is information that is more difficult to be acquired compared to the main information.

The number of pieces of sub-information inputted and accumulated in step S1 does not need to be as large as the number of pieces of main information inputted and accumulated in step S2 described below. That is, the number of pieces of sub-information may be less than the number of pieces of main information. Furthermore, the sub-information inputted and accumulated in step S1 does not necessarily need to be the information acquired from the same individual piece as the main information inputted and accumulated in step S2.

Each sub-information inputted and accumulated in step S1 is classified into categories in advance.

The main information input device 10 inputs information easy to be acquired as main information, and accumulates the inputted main information (step S2). An example of information easy to be acquired that becomes the main information includes an image acquired by a device in widespread use such as a camera. The image is information frequently used in classification and correlation of data. An input and accumulation mode of the main information of the main information input device 10 may be a mode of collectively inputting and accumulating each main information. Furthermore, a mode of sequentially inputting and sequentially accumulating each main information, and performing the processes after step S3 may be adopted. Further, the information generally used in the system of performing classification and correlation of data may be used to be inputted to the main information input device 10 as the main information.

The sub-information selection device 30 evaluates the category attribution degree of each sub-information accumulated in the sub-information input device 20, and selects the sub-information with high category attribution degree (step S3). The sub-information selection device 30 performs selection of the sub-information by category attribution degree in the following manner, for example.

The sub-information selection device 30 selects the sub-information being the target for calculating the attribution degree, converts the relevant sub-information to a column vector, and checks the category (referred to as i) to which the relevant sub-information belongs. Here, the column vectorized sub-information is expressed as A. The sub-information selection device 30 performs a main component analysis with members other than the sub-information A of the sub-information of the category I (Leave-One-Out). The result of the main component analysis is $P^i=[P1^i, \ldots, Pk^i, \ldots Px^i]$. The sub-information selection device 30 calculates $t^i$ shown below. In equation (1), "T" represents transposition.

$$t^i = [t0^i, \ldots, tx^i]^T = A^T P^i \qquad \text{Equation (1)}$$

The sub-information selection device 30 then calculates a reconfiguration error $g^{self}$ in the self-category (category to which the sub-information selected as the target for calculating the attribution degree belongs). The sub-information selection device 30 calculates the reconfiguration error $g^{self}$ with the following equation (2).

$$g^{self} = \text{norm}(A - P^i t^i) = \text{norm}(A - P^i A^T P^i) \qquad \text{Equation (2)}$$

Here, norm (·) is the norm amount such as least square norm, Manhattan distance, and the like.

Suppose there are N−1 counter-categories of category 1, ... j, ... N(j≠i) to which the sub-information A does not belong. The sub-information selection device 30 performs the main component analysis with each N−1 categories. The result of the main component analysis in each category is $P^j = [P1^j, \ldots, Pk^j, \ldots Px^j]$.

The sub-information selection device 30 then calculates a reconfiguration error average (average of the reconfiguration errors) $g^{others}$ of the counter-categories. The sub-information selection device 30 then calculates the reconfiguration error average $g^{others}$ with the following equation (3).

$$g^{others} = \frac{1}{N-1} \sum_{j \neq i}^{N} \text{norm}(A - P^j A^T P^j) \qquad \text{Equation (3)}$$

The category attribution degree (referred to as $g^{belong}$) of the sub-information is defined as the difference between the reconfiguration error average $g^{others}$ and the reconfiguration error $g^{self}$ in the self-category as shown in the following equation (4), or the ratio of the reconfiguration error average $g^{others}$ and the reconfiguration error $g^{self}$ in the self-category (ratio of the reconfiguration error average $g^{others}$ with respect to the reconfiguration error $g^{self}$) as shown in the following equation (5).

$$g^{belong} = g^{others} - g^{self} \qquad \text{Equation (4)}$$

$$g^{belong} = g^{others} / g^{self} \qquad \text{Equation (5)}$$

Therefore, the sub-information selection device 30 calculates the category attribution degree $g^{belong}$ of the sub-information according to equation (4) and equation (5). The sub-information selection device 30 evaluates the category attribution degree of each sub-information and selects the sub-information with high category attribution degree in the above manner.

The preferred sub-information $g^{belong}$ (i.e., sub-information $g^{belong}$ to be selected) is the sub-information of the case when the error of the self-category (reconfiguration error in the self-category) $g^{self}$ is small, and the error of the counter-category (reconfiguration error average of the counter-category) $g^{others}$ is large. If the error $g^{self}$ of the self-category is smaller and the error $g^{others}$ of the opposing category is larger, the attribution degree $g^{belong}$ becomes a larger value in the definition of attribution degree in both equation (4) and equation (5).

If the attribution degree $g^{belong}$ is defined as in equation (4), the properties of the self-category with respect to other categories are not provided when $g^{belong}$ is smaller than or equal to 0. Accordingly, if the attribution degree $g^{belong}$ is defined as in equation (4), the sub-information selection device 30 preferably excludes the sub-information whose attribution degree $g^{belong}$ is smaller than or equal to 0 from the selection target.

In other words, the sub-information selection device 30 preferably selects the sub-information whose attribution degree $g^{belong}$ is greater than 0.

If the attribution degree $g^{belong}$ is defined as shown in equation (5), the properties of the self-category with respect to other categories are not provided if $g^{belong}$ is smaller than or equal to 1. Accordingly, if the attribution degree $g^{belong}$ is defined as in equation (5), the sub-information selection device 30 preferably excludes the sub-information whose attribution degree $g^{belong}$ is smaller than or equal to 1 from the selection target. In other words, the sub-information selection device 30 preferably selects the sub-information whose attribution degree $g^{belong}$ is greater than 1.

If the number of sub-information that can be used as a filter is limited by restriction of resources in the correlation feature extraction device 40, the sub-information selection device 30 selects the sub-information in the descending order according to large attribution degree $g^{belong}$ value.

When performing correlation using the extracted feature, one sub-information to be the target for calculating the attribution degree configures one category with only the sub-information itself. Accordingly, $g^{self} = 0$ when defining the attribution degree $g^{belong}$ as shown in equation (4). Furthermore, $g^{self} = 1$ when defining the attribution degree $g^{belong}$ as shown in equation (5).

After step S3, the correlation feature extraction device 40 uses the sub-information selected by the sub-information selection device 30 as the feature extraction filter, and extracts a feature corresponding to the main information from a correlation between the main information and the sub-information (step S4).

Suppose there exists a function f that satisfies $I_i = f(X_i)$ between the main information (referred to as $I_i$) and the sub-information (referred to as $X_i$) of the same individual piece. In this case, the error minimum estimate error $F_0(I^i)$ expressed as equation (6) using the sub-information X0 of another individual piece can be also expected to have the effect as the feature quantity representing the property of the main information $I^i$.

$$F_0(I_i) = \text{norm}(I_i - f(X_0)) \qquad \text{Equation (6)}$$

The error minimum estimate error $F_0(I_i)$ obtained by using the sub-information $X_0$ selected based on the category attribution degree in equation (6) can be used as a feature quantity reflecting the category attribution degree. Therefore, the correlation feature extraction device 40 calculates $F_0(I_i)$ by equation (6) using the sub-information $X_0$ selected in step S3 and the main information accumulated in the main information input device 10, where the calculation result $F_0(I_i)$ is assumed as the feature. The correlation feature extraction device 40 outputs the calculated feature (feature quantity).

The feature quantity output by the correlation feature extraction device 40 is input to the learning/identification system (system for classifying and correlating the data. Learning/identification device 50 in the example shown in FIG. 1), where the function f does not necessarily need to be a correct function if the learning/identification system corrects the feature quantity. In this case, the function f may be a simple mapping 1. If a known function representing the relationship between the main information and the sub-information exists, such known function is preferably used. An example of a case of using the known function includes a case where the main information Ii is the image and the sub-information Xi is the illumination space base. The illumination space base is the information amount reflecting a three-dimensional image and the reflectivity of the face, and, according to a document "Peter N. Belhumeur, David J Kriegman, What Is the Set of Images of an Object Under All Possible Illumination Conditions?", International Journal of Computer Vision, Vol. no. 28, 245-260, 998", a matrix of N×3 is obtained assuming the image $I_i$ is a N-dimensional vertical vector, and the relationship of the following equation (7) is met.

$$I_i = X_{is} \qquad \text{Equation (7)}$$

In equation (7), s is referred to as an illumination vector, and is a three-dimensional vector representing the direction and the magnitude of the illumination. In this case, when the sub-information $X_0$ of another individual piece (sub-information acquired from an individual piece which is different from the main information) is used, the correlation feature extraction device 40 calculates the s (illumination vector) at which the value of equation (8) shown below becomes a minimum, and uses $F_0(I_i)$ in such case as the feature.

$$F_0(I_i) = \text{norm}(I_i - X_{0s}) \qquad \text{Equation (8)}$$

A case where the main information $I_i$ is an image of a living being, and the sub-information $X_i$ is a thermo-image of the relevant living being is considered as an example of when the function representing the relationship between the main information and the sub-information is unknown. In this case, the definite relationship between the main information and the sub-information is not known. However, both (main information and sub-information) are images and have the same dimension, and thus the function f can be assumed as simple mapping 1. In this case, the correlation feature extraction device 40 may calculate the feature F0(Ii) with the following equation (9).

$$F_0(I_i) = \text{norm}(I_i - X_0) \qquad \text{Equation (9)}$$

That is, the correlation feature extraction device 40 calculates the feature quantity using the difference between the main information $I_i$ and the sub-information $X_0$ as shown in equation (9) when the dimensions of the main information and the sub-information are the same. The feature quantity $F_0(I_i)$ obtained through equation (9) is not a feature quantity having a direct basis as in the feature quantity $F_0(I_i)$ obtained through equation (8). However, it is a feature quantity reflecting the category attribution degree by the main information and the sub-information, and the property that the category attribution degree by the main information and the sub-information is reflected can be used in the learning/identification system.

The correlation feature extraction device 40 outputs the obtained feature quantity to the learning/identification device 50, and the learning/identification device 50 performs classification and correlation of data based on the feature quantity. As described above, however, the learning/identification device 50 is not an essential component of the present invention.

According to the present invention, the sub-information selection device 30 selects the sub-information with high category attribution degree from the sub-information (information difficult-to-be-acquired), and the correlation feature extraction device 40 uses such sub-information to extract a feature. Therefore, a feature advantageous for classification and correlation can be extracted by using information difficult to be acquired even when it is impossible to acquire the information difficult-to-be-acquired from all individuals.

The correlation feature extraction device 40 uses the sub-information classified into categories in advance as a feature extraction filter, and extracts (calculates) the feature corresponding to the main information from the correlation of the main information and the sub-information. As a result, a feature which is unique with each category can be extracted. This feature is advantageous for classification as it reflects the feature of the category to be classified. That is, feature extraction suited for classification can be carried out in the present invention. For instance, assume sub-information αs, βs, γs, and main information αm, βm, γm are obtained with respect to categories α, β, γ, respectively. If the feature is extracted using the sub-information αs, βs, γs with respect to the main information αm, feature vectors reflecting the category, such as, strong correlation between αm and αs, weak correlation between αm and βs, and weak correlation between αm and γs are obtained. Similarly, if the feature is extracted using the sub-information αs, βs, γs with respect to the main information βm, feature vectors reflecting the category, such as, weak correlation between βm and αs, strong correlation between βm and αs, and weak correlation between βm and γs are obtained. Moreover, if the feature is extracted using the sub-information αs, βs, γs with respect to the main information γm, feature vectors reflecting the category, such as, weak correlation between γm and αs, weak correlation between γm and βs, and strong correlation between γm and γs are obtained.

In the first exemplary embodiment, the correlation feature extraction device 40 uses the sub-information (information difficult-to-be-acquired) as the feature extraction filter, and extracts a feature from the main information (information easy-to-be-acquired) using the feature extraction filter. Thus, a feature dependent on the internal structure of the data such as appearance can be extracted.

The sub-information selection device 30 selects effective sub-information (sub-information in which the value of attribution degree is larger than the reference), and the correlation feature extraction device 40 uses the sub-information as the feature extraction filter. The sub-information to be selected is input to the sub-information input device 20 in advance and accumulated therein. Therefore, the feature can be extracted by inputting the main information to the main information input device 10. As a result, the design of a system for performing classification and correlation can be facilitated.

The flowchart shown in FIG. 2 is illustrative, and the process does not necessarily need to be performed in the order shown in FIG. 2. For instance, after inputting and accumulating the sub-information in advance, the sub-information selection device 30 may calculate the category attribution degree for each sub-information and select the sub-information based on the magnitude of the attribution degree. The main information input device 10 may thereafter sequentially input and accumulate the main information, and the correlation feature extraction device 40 may extract a feature corresponding to the main information using the relevant main information and the selected sub-information. In other words, step S3 may be executed before step S2.

SECOND EXEMPLARY EMBODIMENT

FIG. 3 is a block diagram showing a configuration example of a second exemplary embodiment of the invention. A feature extraction apparatus of the second exemplary embodiment includes each device corresponding to each apparatus shown in the first exemplary embodiment. That is, the feature extraction apparatus of the second exemplary embodiment includes a main information input apparatus 100, a sub-information input apparatus 200, a sub-information selection apparatus 300, and a correlation feature extraction apparatus 400, as shown in FIG. 3. Further, learning/identification apparatus 500 may be arranged.

The main information input apparatus 100 corresponds to the main information input device 10 in the first exemplary embodiment, and operates similar to the main information input device 10. The sub-information input apparatus 200 corresponds to the sub-information input device 20 in the first exemplary embodiment, and operates similar to the sub-information input device 20. The sub-information selection apparatus 300 corresponds to the sub-information selection device 30 in the first exemplary embodiment, and operates similar to the sub-information selection device 30. The correlation feature extraction apparatus 400 corresponds to the correlation feature extraction device 40 in the first exemplary embodiment, and operates similar to the correlation feature extraction device 40. The learning/identification apparatus 500 corresponds to the learning/identification device 50 in the first exemplary embodiment, and operates similar to the learning/identification device 50. The operation of each apparatus 100 to 500 is similar to that of each device 10 to 50 (see FIG. 1) in the first exemplary embodiment, and the feature extraction apparatus of the second exemplary embodiment performs operations similar to steps S1 to S4 (see FIG. 2). Thus, detailed description related to the operation will be omitted. The configuration of each apparatus will be described below.

FIG. 4 is an explanatory view showing a configuration example of the main information input apparatus 100. The main information input apparatus 100 is realized by a storage apparatus 101 such as a disc or a memory. The mode of input and accumulation of the main information in the main information input apparatus 100 may be a mode of collectively inputting and accumulating (storing) each main information. Furthermore, a mode of sequentially inputting and sequentially accumulating each main information, and performing the processes after step S3 may be adopted. In the mode of accumulating great amount of main information in a collective process, a high-capacity magnetic disc etc. is preferably used for the storage apparatus 101. In the mode of sequentially inputting and accumulating the main information and performing the processes after step S3, high-speed access DRAM etc. is preferably used for the storage apparatus 101. The main information stored in the storage apparatus 101 is read by the correlation feature extraction apparatus 400 in step S4.

FIG. 5 is an explanatory view showing a configuration example of the sub-information input apparatus 200. The sub-information input apparatus 200 is realized by a storage apparatus 201 such as a disc or a memory. Assumption is made that the sub-information input apparatus 200 collectively inputs and accumulates the sub-information. Therefore, a high-capacity magnetic disc etc. is preferably used for the storage apparatus 201. The sub-information stored in the storage apparatus 201 is read by the sub-information selection apparatus 300 in step S3.

FIG. 6 is an explanatory view showing a configuration example of the sub-information selection apparatus 300. The sub-information selection apparatus 300 includes a calculation apparatus 301 such as a CPU and a storage apparatus 302 such as a disc or a memory. The calculation apparatus 301 reads each sub-information from the storage apparatus 201 of the sub-information input apparatus 200, calculates the attribution degree, and selects the sub-information which attribution degree is larger than a value that becomes a reference in step S3 (see FIG. 2). This process is the same as the operation of the sub-information selection device 30 in the first exemplary embodiment. The calculation apparatus 301 accumulates the selected sub-information in the storage apparatus 302. The sub-information accumulated in the storage apparatus 302 is read by the correlation feature extraction apparatus 400 in step S4.

FIG. 7 is an explanatory view showing a configuration example of the correlation feature extraction apparatus 400. The correlation feature extraction apparatus 400 includes a calculation apparatus 401 such as a CPU. The calculation apparatus 401 reads the main information from the storage apparatus 101 of the main information input apparatus 100, and reads the selected sub-information from the storage apparatus 302 of the sub-information selection apparatus 300 in step S4 (see FIG. 2). The calculation apparatus 401 then calculates a feature corresponding to the main information from the correlation of the main information and the sub-information by equation (6). The calculation apparatus 401 outputs the calculated feature. If the feature extraction apparatus includes the learning/identification apparatus 500, the learning/identification apparatus 500 becomes the output destination of the feature.

FIG. 8 is an explanatory view showing a configuration example of the learning/identification apparatus 500. The learning/identification apparatus 500 includes a calculation apparatus 501 such as a CPU, a storage apparatus 502 such as a DRAM memory for accumulating the temporary calculation result enabling high-speed access, and a high-capacity storage apparatus 503 such as a disc for storing the calculation result of the calculation apparatus 501. The calculation apparatus 501 uses the feature output from the correlation feature extraction apparatus 400 to perform the calculation related to learning/identification, and accumulates the calculation result in the high-capacity storage apparatus 503.

Effects similar to the first exemplary embodiment are obtained in the second exemplary embodiment.

As described in the first exemplary embodiment, the process does not necessarily need to be proceeded in the order shown in FIG. 2. For instance, after inputting and accumulating the sub-information in advance, the sub-information selection apparatus 300 may calculate the category attribution degree for each sub-information and select the sub-information based on the magnitude of the attribution degree. The main information input apparatus 100 may thereafter sequentially input and accumulate the main information, and the correlation feature extraction apparatus 400 may extract a feature corresponding to the main information using the relevant main information and the selected sub-information. In other words, step S3 may be executed before step S2.

THIRD EXEMPLARY EMBODIMENT

FIG. 9 is a block diagram showing a configuration example of a third exemplary embodiment of the invention. A feature extraction apparatus of the third exemplary embodiment includes a calculation apparatus 701, a program storage unit 702, a storage apparatus 703, a main information input unit 704, a sub-information input unit 705, and an output unit 706.

The calculation apparatus 701 controls the entire feature extraction apparatus 700 according to a feature extraction program stored in the program storage unit 702, and executes the process of each step described in the first exemplary embodiment. The calculation apparatus 701 is realized by a CPU and the like. The feature extraction apparatus 700 includes a buffer (not shown) for loading the main information and the sub-information used by the calculation apparatus 701 in the calculation.

The program storage unit 702 stores the feature extraction program for causing the calculation apparatus 701 to execute the process.

The storage apparatus 703 stores the inputted main information and sub-information.

The main information input unit 704 is an input interface of the main information, and the sub-information input unit 705 is an input interface of the sub-information. The input interface of the main information and the input interface of the sub-information may be common. The output unit 706 is an interface for outputting the feature calculated by the calculation apparatus 701.

The calculation apparatus 701 inputs the main information through the main information input unit 704, and accumulates the main information in the storage apparatus 703. Similarly, the calculation apparatus 701 inputs the sub-information through the sub-information input unit 705, and accumulates the sub-information in the storage apparatus 703.

The calculation apparatus 701 selects the sub-information, similar to the sub-information selection device 30 in the first exemplary embodiment, and extracts a feature, similar to the correlation feature extraction device 40 in the first exemplary embodiment. The calculation apparatus 701 outputs the extracted feature through the output unit 706.

An input mode of the information includes a mode (referred to as first input mode) in which a data group (sub-information is lacking in some individual piece of data) including the main information and the sub-information is collectively input, and a mode (referred to as second input mode) in which a data group including the main information and a data group including the sub-information are independent, a small number of sub-information is input to and accumulated in the feature extraction apparatus in advance, and the main information is sequentially input afterward.

FIG. 10 is a flowchart showing an example of progress of the process of the calculation apparatus 701 in the first input mode. The main information and the sub-information of the data group (sub-information of some individual piece of data is lacking, and number of sub-information is less than number of sub-information) are assumed to be already collectively input and accumulated in the storage apparatus 703.

The calculation apparatus 701 loads one of the main information of each individual piece to the buffer (step S100). The calculation apparatus 701 determines whether or not the sub-information of the individual piece same as the individual piece from which the main information is acquired can be loaded (steps S101, S102). If the sub-information of the individual piece same as the individual piece from which the main information is acquired does not exist and cannot be loaded (N of step S102), the process returns to step S100, and the processes after step S100 are repeated.

If the sub-information of the individual piece same as the individual piece from which the main information is acquired exists and can be loaded (Y of step S102), the calculation apparatus 701 loads the sub-information to the buffer (step S103).

After step S103, the calculation apparatus 701 determines whether or not all the main information are loaded to the buffer (step S104). If not all the main information are loaded (N of step S104), the process returns to step S100, and the processes after step S100 are repeated. If all the main information are loaded (Y of step S104), the calculation apparatus 701 calculates the attribution degree of each sub-information (step S105). The calculation apparatus 701 selects the sub-information according to the magnitude of the attribution degree (step S106). The calculation of the attribution degree and the selection of the sub-information in steps S105, S106 may be performed similar to the calculation and the selection described in the first exemplary embodiment.

Thereafter, the calculation apparatus 701 extracts (calculates) a feature of the main information with the selected sub-information as the feature extraction filter (step S107). This calculation may be performed similar to the calculation described in the first exemplary embodiment.

After step S107, the calculation apparatus 701 determines whether or not the feature is calculated for all the main information (step S108). If the feature is not calculated for all the main information (N of step S108), the process returns to step S107, and the processes after step S107 are repeated. The calculation apparatus 701 outputs the calculated feature.

FIG. 11 is a flowchart showing an example of progress of the process of the calculation apparatus 701 in the second input mode. In the second input mode, the main information and the sub-information do not necessarily need to be acquired from the same individual piece, and consideration is made in acquiring only the sub-information in advance. Here, assumption is made that such sub-information is input in advance and accumulated in the storage apparatus 703.

The calculation apparatus 701 loads all the sub-information to the buffer (step S200). The calculation apparatus 701 then calculates the category attribution degree for every sub-information (step S201). After calculating the attribution degree for one sub-information, the calculation apparatus 701 determines whether or not the calculation of the attribution degree is completed for all the sub-information (step S202). If the calculation of the attribution degree is not completed for all the sub-information (N of step S202), the process returns to step S201, and the processes after step S201 are repeated. If the calculation of the attribution degree is completed for all the sub-information (Y of step S202), the sub-information is selected according to the magnitude of the attribution degree (step S203). The calculation of the attribution degree and the selection of the sub-information may be performed similar to the calculation and the selection described in the first exemplary embodiment.

The calculation apparatus 701 then loads the sequentially inputted main information to the buffer (step S204). The calculation apparatus 701 then extracts (calculates) a feature from the main information with the selected sub-information as the feature extraction filter (step S205). This calculation may be also performed similar to the calculation described in the first exemplary embodiment.

Effects similar to the first exemplary embodiment are obtained in the third exemplary embodiment.

The present invention is applicable to feature extraction used in classification by category of human data or correlation of human data necessary in customer data collection in a convenience store etc., security securement in an immigration control system, an entertainment service in a game center, a portable terminal application, and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-373058, filed on Dec. 26, 2005, the disclosure of which is incorporated herein in its entirety by reference.

Figure 1:
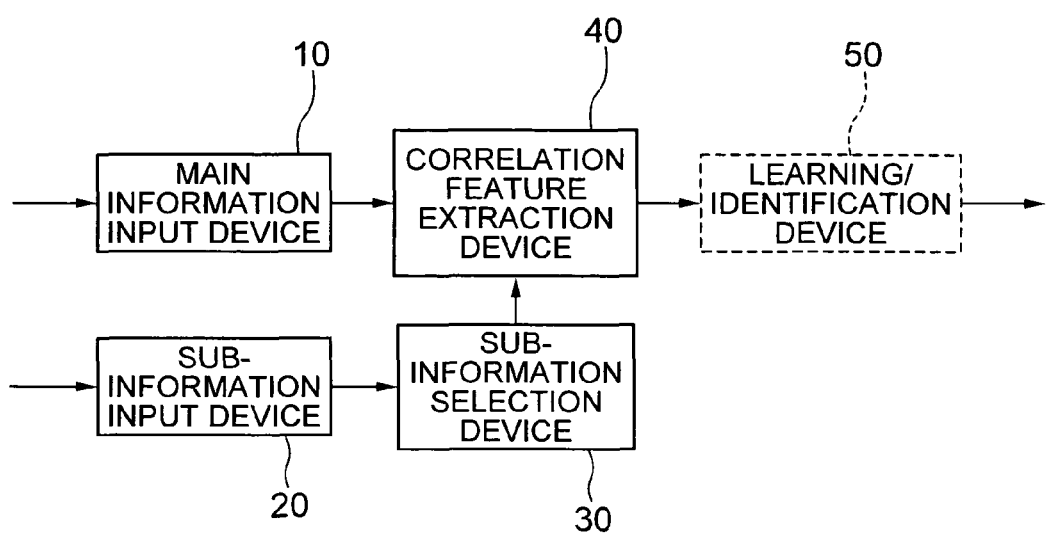
FIG. 1 is a block diagram showing a configuration example of a first exemplary embodiment of the invention.
Figure 2:
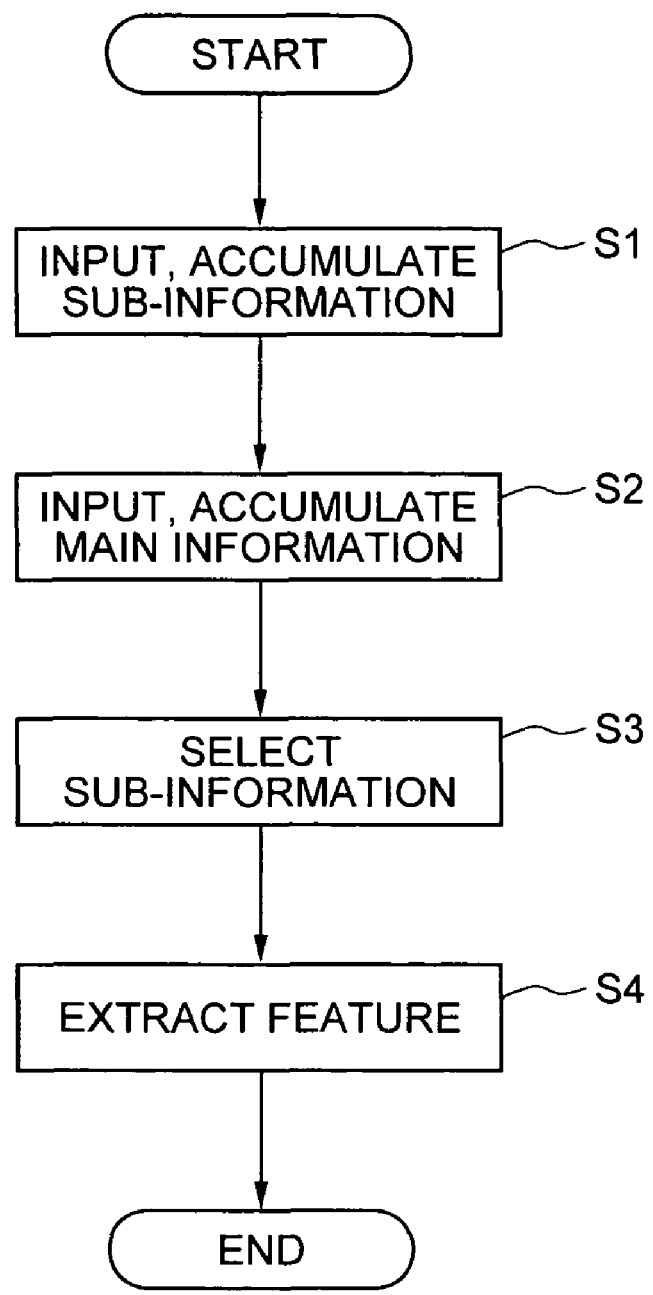
FIG. 2 is a flowchart showing an example of progress of the process by the feature extraction apparatus in the first exemplary embodiment.
Figure 3:
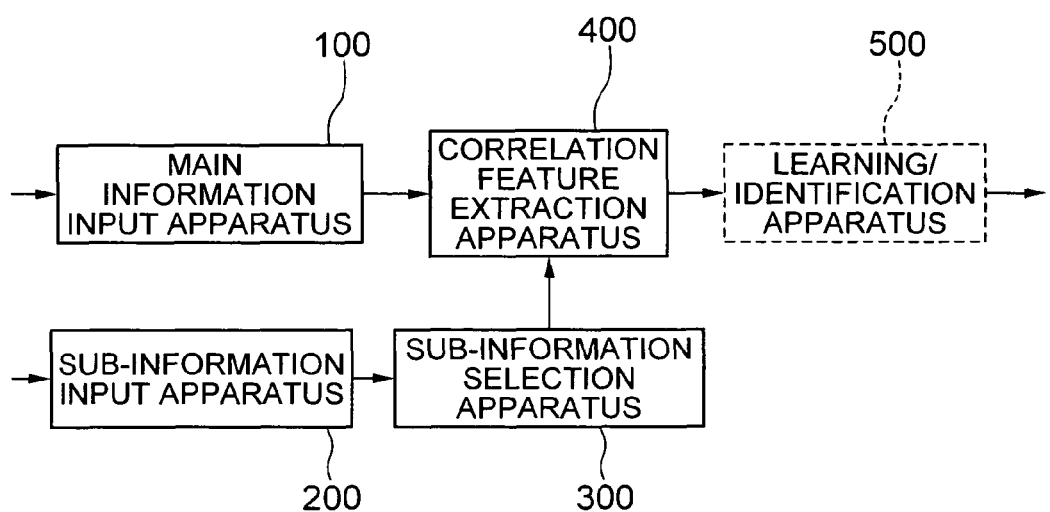
FIG. 3 is a block diagram showing a configuration example of a second exemplary embodiment of the invention.
Figure 4:
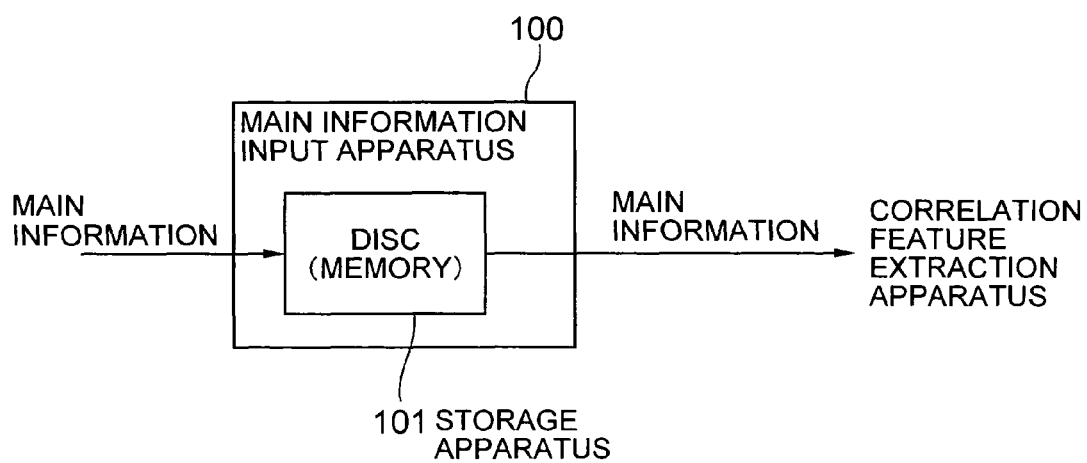
FIG. 4 is an explanatory view showing a configuration example of a main information input apparatus.
Figure 5:
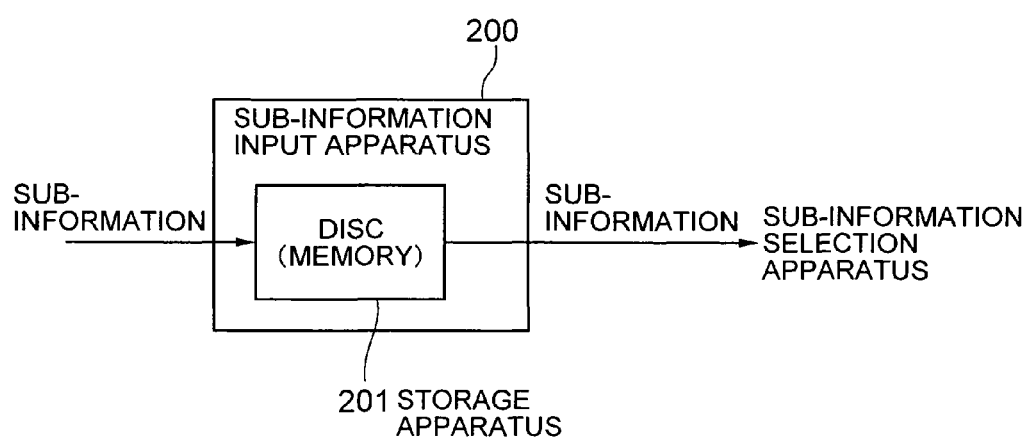
FIG. 5 is an explanatory view showing a configuration example of a sub-information input apparatus.
Figure 6:
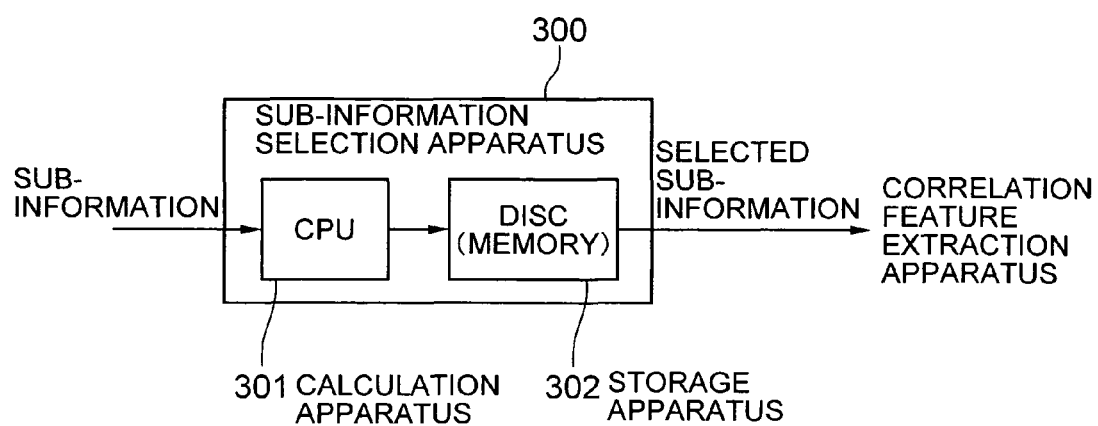
FIG. 6 is an explanatory view showing a configuration example of a sub-information selection apparatus.
Figure 7:
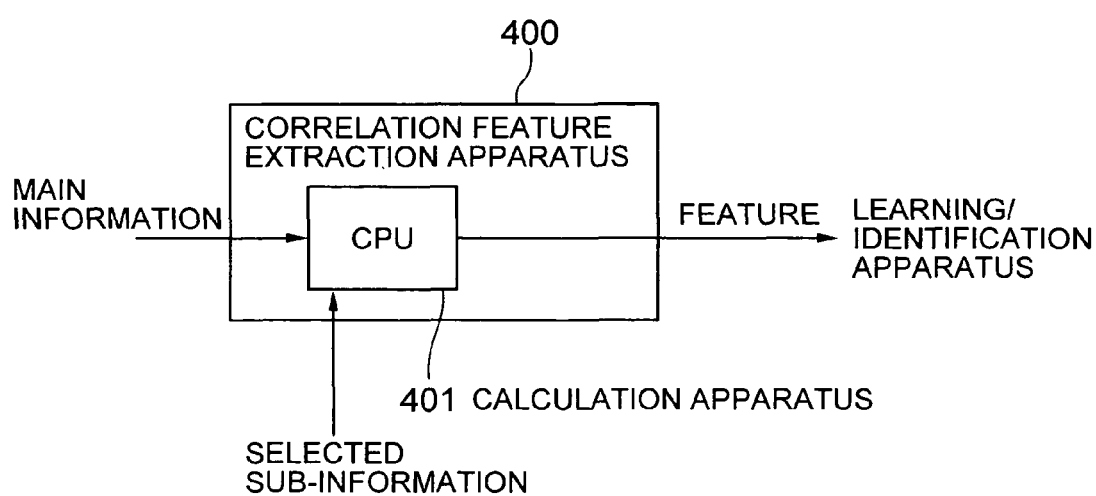
FIG. 7 is an explanatory view showing a configuration example of a correlation feature extraction apparatus.
Figure 8:
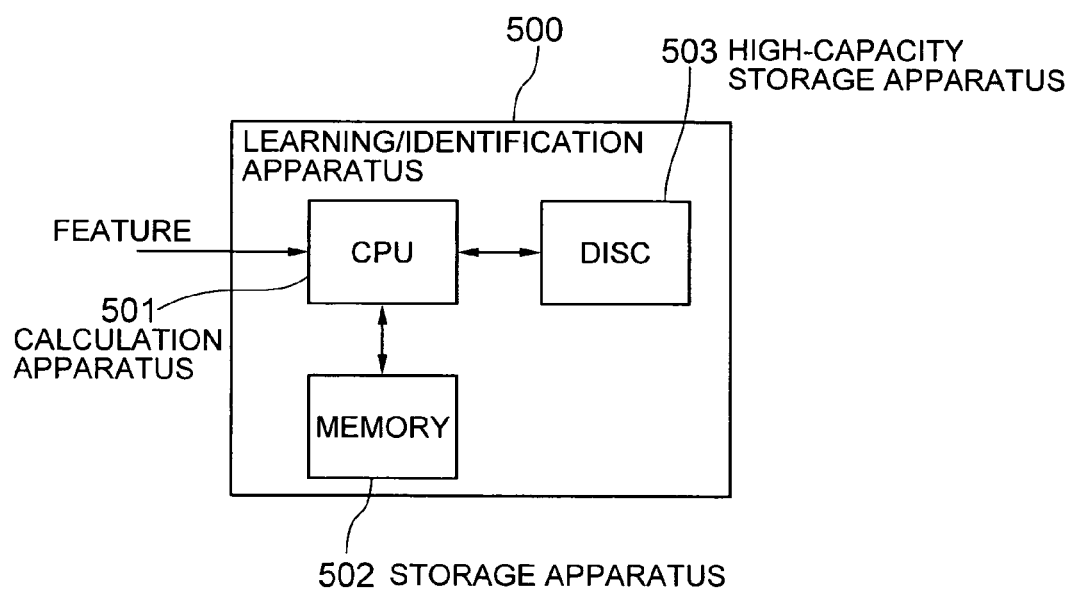
FIG. 8 is an explanatory view showing a configuration example of a learning/identification apparatus.
Figure 9:
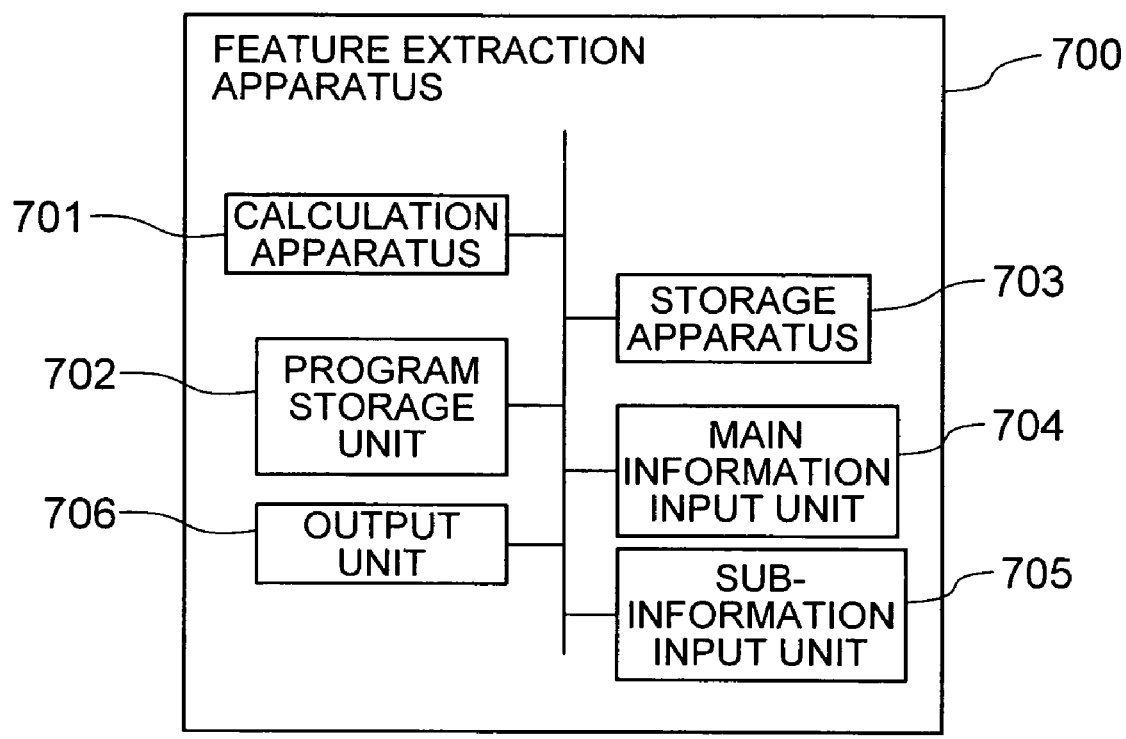
FIG. 9 is a block diagram showing a configuration example of a third exemplary embodiment of the invention.
Figure 10:
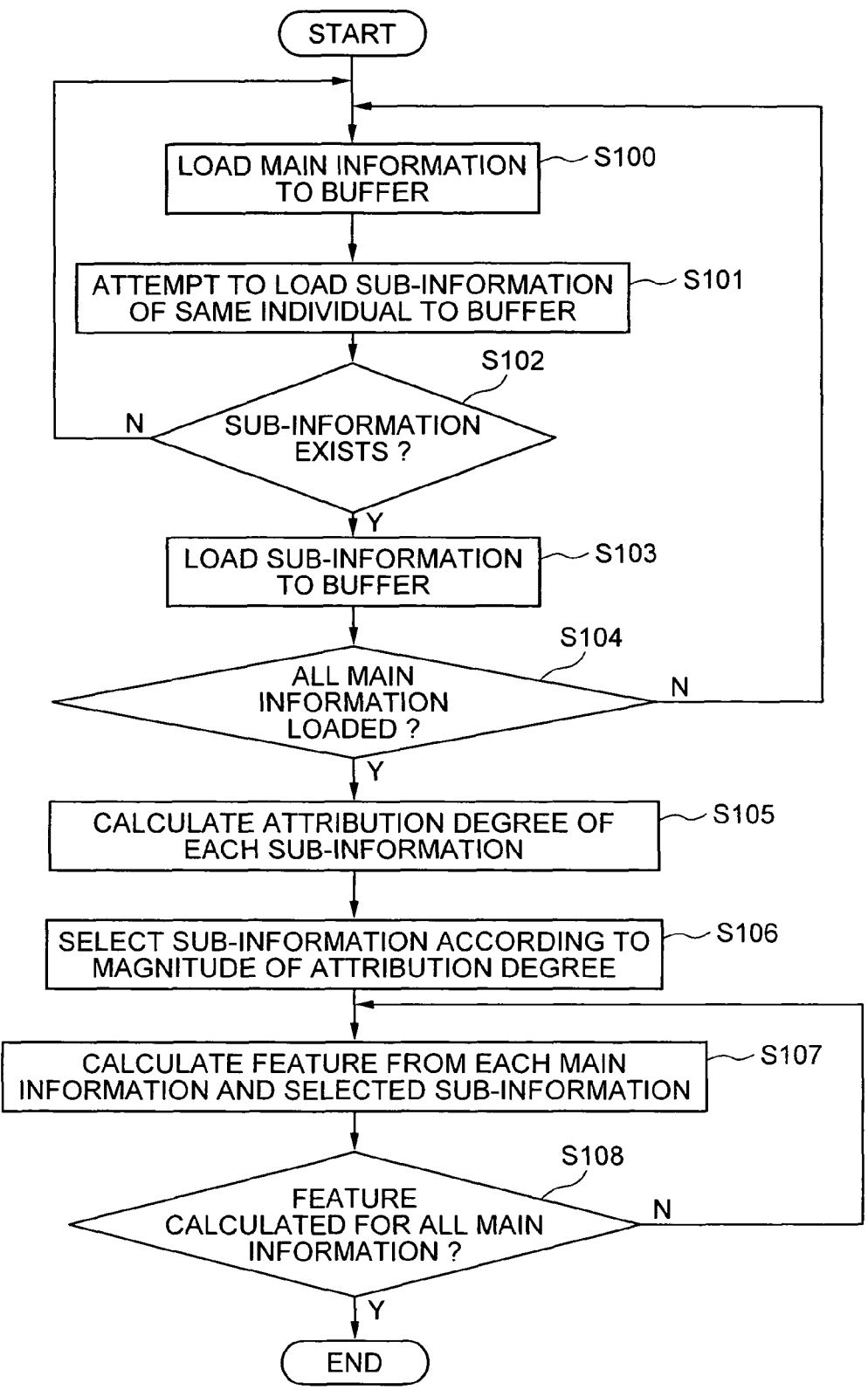
FIG. 10 is a flowchart showing an example of progress of the process of a calculation apparatus.
Figure 11:
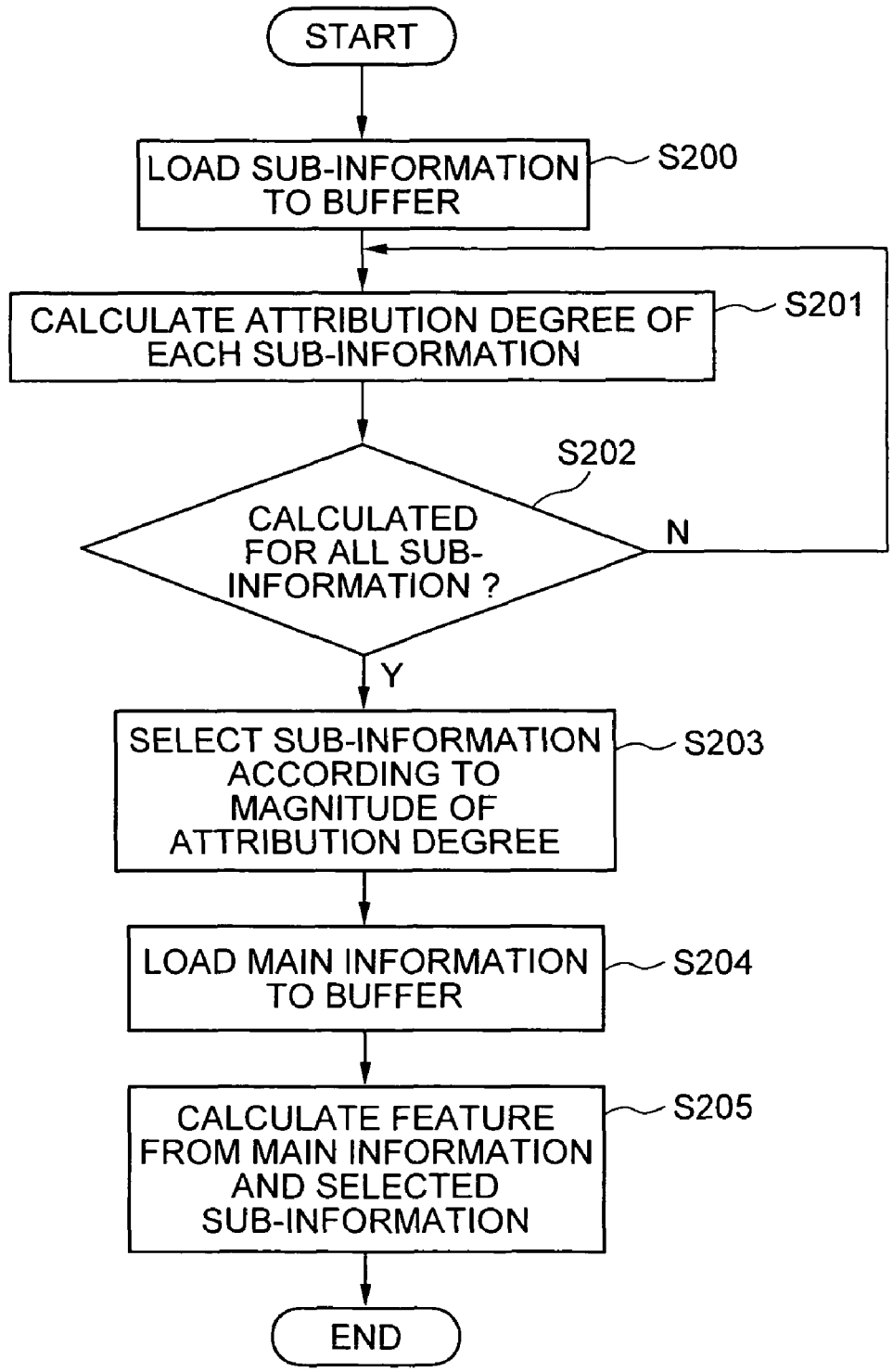
FIG. 11 is a flowchart showing an example of progress of the process of the calculation apparatus.

DESCRIPTION OF SYMBOLS 10 main information input device
20 sub-information input device
30 sub-information selection device
40 correlation feature extraction device

The invention claimed is:

1. A feature extraction apparatus for extracting, from main information obtained from an individual piece of data, a feature of the individual piece; the feature extraction apparatus comprising:
a main information input device that inputs information acquirable from all individuals as main information and accumulates the inputted main information;
a sub-information input device that inputs information not necessarily acquirable from all the individuals as sub-information and accumulates the inputted sub-information;
a sub-information selection device that selects the information not necessarily acquirable from all the individuals that is effective in classification and correlation of data from the sub-information inputted and accumulated in the sub-information input device; and
a correlation feature extraction device that extracts a feature related to the correlation between the main information and the sub-information from the sub-information which is selected by the sub-information selection device,
wherein the sub-information selection device performs a main component analysis of the sub-information, calculates the attribution degree using a reconfiguration error in a category to which the sub-information being a target for calculating the attribution degree belongs and an average of the reconfiguration error in categories other than the relevant category, and selects the sub-information whose attribution degree is larger than a predetermined reference.

2. The feature extraction apparatus according to claim 1, wherein the sub-information input device includes a sub-information storage device for storing the sub-information classified into categories in advance; and
wherein the correlation feature extraction device calculates a feature quantity of the individual piece based on the correlation between the main information and the sub-information, by using the main information and the sub-information which is selected by the sub-information selection device.

3. The feature extraction apparatus according to claim 2, wherein the correlation feature extraction device calculates the feature quantity using a difference between the main information and the sub-information having the same dimension.

4. The feature extraction apparatus according to claim 2, wherein the feature quantity is a relationship with the category of the individual piece being a target for extracting the feature.

5. The feature extraction apparatus according to claim 2, wherein the feature quantity is sub-information of a target for extracting the feature obtained from a relationship of the individual piece being the target for extracting the feature and the category, and the correlation between the main information and the sub-information.

6. The feature extraction apparatus according to claim 1, wherein the main information is information acquirable from all individual pieces, and the sub-information is information not necessarily acquirable from all individual pieces.

7. A feature extraction method for extracting a feature of an individual piece from main information obtained from an individual piece of data, comprising:
inputting, by a main information input device, information acquirable from all individuals as main information and accumulating the inputted main information;
inputting, by a sub-information input device, information not necessarily acquirable from all the individuals as sub-information and accumulating the inputted sub-information;
selecting, by a sub-information selection device, the information not necessarily acquirable from all the individuals that is effective in classification and correlation of data from the sub-information inputted and accumulated in the sub-information input device;
extracting, by a correlation feature extraction device, a feature related to the correlation between the main information and the sub-information from the sub-information which is selected by the sub-information selection device;
performing a main component analysis of the sub-information;
calculating the attribution degree using a reconfiguration error in a category to which the sub-information being a target for calculating the attribution degree belongs and an average of the reconfiguration error in categories other than the relevant category; and
selecting the sub-information whose attribution degree is larger than a predetermined reference.

8. The feature extraction method according to claim 7, further comprising:
calculating a feature quantity of the individual piece based on the correlation between the main information and the sub-information, by using the main information and the selected sub-information.

9. The feature extraction method according to claim 8, further comprising calculating the feature quantity using a difference between the main information and the sub-information having the same dimension.

10. The feature extraction method according to claim 8, wherein the feature quantity is a relationship with the category of the individual piece being a target for extracting the feature.

11. The feature extraction method according to claim 8, wherein the feature quantity is sub-information of a target for extracting the feature obtained from a relationship of the individual piece being the target for extracting the feature and the category, and the correlation between the main information and the sub-information.

12. The feature extraction method according to claim 7, wherein the main information is information acquirable from all individual pieces, and the sub-information is information not necessarily acquirable from all individual pieces.

13. A non-transitory computer readable storage medium having machine instructions stored therein, the instructions being executable by a computer to cause the computer to extract a feature of an individual piece from main information obtained from an individual of data, the instructions comprising instructions to:
    input information acquirable from all individuals as main information and accumulate the inputted main information;
    input information not necessarily acquirable from all the individuals as sub-information and accumulate the inputted sub-information;
    select, by a sub-information selection device, the information not necessarily acquirable from all the individuals that is effective in classification and correlation of data from the sub-information inputted and accumulated;
    extract a feature related to the correlation between the main information and the sub-information from the sub-information which is selected by the sub-information selection device;
    perform a main component analysis of the sub-information;
    calculate the attribution degree using a reconfiguration error in a category to which the sub-information being a target for calculating the attribution degree belongs and an average of the reconfiguration error in categories other than the relevant category; and
    select the sub-information whose attribution degree is larger than a predetermined reference.

14. The non-transitory computer readable storage medium according to claim 13, further comprising instructions to:
    calculate a feature quantity of the individual piece based on the correlation between the main information and the sub-information, by using the main information and the selected sub-information in a correlation feature extraction process.

15. The non-transitory computer readable storage medium according to claim 14, further comprising instructions to calculate the feature quantity using a difference between the main information and the sub-information having the same dimension in the correlation feature extraction.

16. The non-transitory computer readable storage medium according to claim 14, wherein the feature quantity is a relationship with the category of the individual piece being a target for extracting the feature.

17. The non-transitory computer readable storage medium according to claim 14, wherein the feature quantity is sub-information of a target for extracting the feature obtained from a relationship of the individual piece being the target for extracting the feature and the category, and the correlation between the main information and the sub-information.

18. The non-transitory computer readable storage medium according to claim 13, wherein the main information is information acquirable from all individual pieces, and the sub-information is information not necessarily acquirable from all individual pieces.

* * * * *

UNITED STATES PATENT AND TRADEMARK OFFICE
CERTIFICATE OF CORRECTION

| | |
|---|---|
| PATENT NO. | : 8,374,434 B2 |
| APPLICATION NO. | : 12/086778 |
| DATED | : February 12, 2013 |
| INVENTOR(S) | : Atsushi Marugame |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this
Eleventh Day of November, 2014

Michelle K. Lee
*Deputy Director of the United States Patent and Trademark Office*